United States Patent [19]
Suzuki et al.

[11] 4,102,578
[45] Jul. 25, 1978

[54] METHOD OF AND APPARATUS FOR RECORDING SURFACE IRREGULARITY OF OBJECT

[75] Inventors: Masane Suzuki; Kiyoshi Suzuki, both of Omiya, Japan

[73] Assignee: Fuji Photo Optical Co., Ltd., Omiya, Japan

[21] Appl. No.: 648,814

[22] Filed: Jan. 13, 1976

[30] Foreign Application Priority Data

Jan. 15, 1975 [JP] Japan .................................... 50-6780

[51] Int. Cl.² .............................................. G01B 11/24
[52] U.S. Cl. .................................... 356/120; 356/199
[58] Field of Search .................. 356/120, 199, 200, 2; 250/237 G

[56] References Cited

U.S. PATENT DOCUMENTS 3,614,237 10/1971 Kyle et al. ............................ 356/120

FOREIGN PATENT DOCUMENTS 2,113,522 9/1972 Fed. Rep. of Germany ....... 356/120
2,139,836 2/1973 Fed. Rep. of Germany ....... 356/120

Primary Examiner—John K. Corbin
Assistant Examiner—R. A. Rosenberger
Attorney, Agent, or Firm—Gerald J. Ferguson, Jr.; Joseph J. Baker

[57] ABSTRACT

A slit image extending in the lateral direction of a travelling object is projected onto the surface of the object from one direction by means of a projection lens. The slit image formed on the object is then projected by means of an image focusing optical system onto a grid to make a light section moire element. The optical axis of the image focusing optical system is different from that of the projection lens employed in the slit image forming optical system. The light section moire element is enlarged in the lateral direction by means of a condenser lens and an anamorphic lens and focused on another slit. Behind the slit is located a film to record a line of light spots which represent the surface irregularity of the object. The film is fed in synchronization with the travel of the object so that the surface irregularities of the object may be recorded on the film in the form of contour lines.

7 Claims, 4 Drawing Figures

METHOD OF AND APPARATUS FOR RECORDING SURFACE IRREGULARITY OF OBJECT

BACKGROUND OF THE INVENTION

1. Field of the Invention

This invention relates to a method of and apparatus for recording surface irregularities of an object in the form of contour lines, and more particularly to a method of and apparatus for recording minute surface irregularities of a moving object such as a travelling flexible web-like material by use of a moire effect.

2. Description of the Prior Art

It has been known in the art to record surface irregularities of an object by use of a moire effect. One example of such a method is disclosed in Japanese Patent Public Disclosure No. 49-69160/1974. In this kind of method, there has been a problem that the vertical vibration or movement of the object is recorded together with the surface irregularities as a noise. In case that the object is a flexible web travelling in one direction as a film base handled in a film manufacturing plant, the flexible web is liable to vibrate or flap up and down. Even in case of a rigid material, the vibration thereof makes a noise in the measurement of the surface irregularities.

SUMMARY OF THE INVENTION

In view of the above described defect inherent in the conventional method of recording surface irregularities, the primary object of the present invention is to provide a method of measuring and recording the surface irregularities of an object travelling in one direction without a noise caused by the vertical vibration thereof.

Another object of the present invention is to provide an apparatus for carrying out the above method.

Still another object of the present invention is to provide a method of and apparatus for recording the surface irregularities of a moving object in the form of contour lines in which the up and down movement of the object or vertical vibration thereof is not recorded as a noise.

In accordance with the present invention there is provided a method of recording the surface irregularities of a moving object in which a slit image extending in the lateral direction of a travelling web-like material or other material is projected onto the surface of the object from the direction normal to the surface thereof, the slit image on the object is focused on a grid comprised of a grating extending in parallel to the slit image on the object through a focusing lens, and a light section moire element formed by the grid and the slit image focused on the grid is projected onto a travelling film by way of a condenser lens and an anamorphic lens through a slit extending in parallel to the slit image formed on the object. By the anamorphic lens, the light section moire element consisting of a line of light spots arranged in a curved line representing the surface irregularities of the object is expanded in the lateral direction so that a line of spots arranged at intervals which represent the surface irregularities of the object will be recorded on the film. The film is fed in synchronization with the travelling object whereby the surface irregularities are continuously recorded on the film in the form of contour lines which represent the surface irregularities of the object. In the vicinity of the grid there is provided a light deflecting means comprising a deflecting prism or a glass fiber plate for compensating for the parallax caused by the optical system through which the slit image on the object is obliquely viewed.

DESCRIPTION OF THE PREFERRED EMBODIMENT

Figure 1:
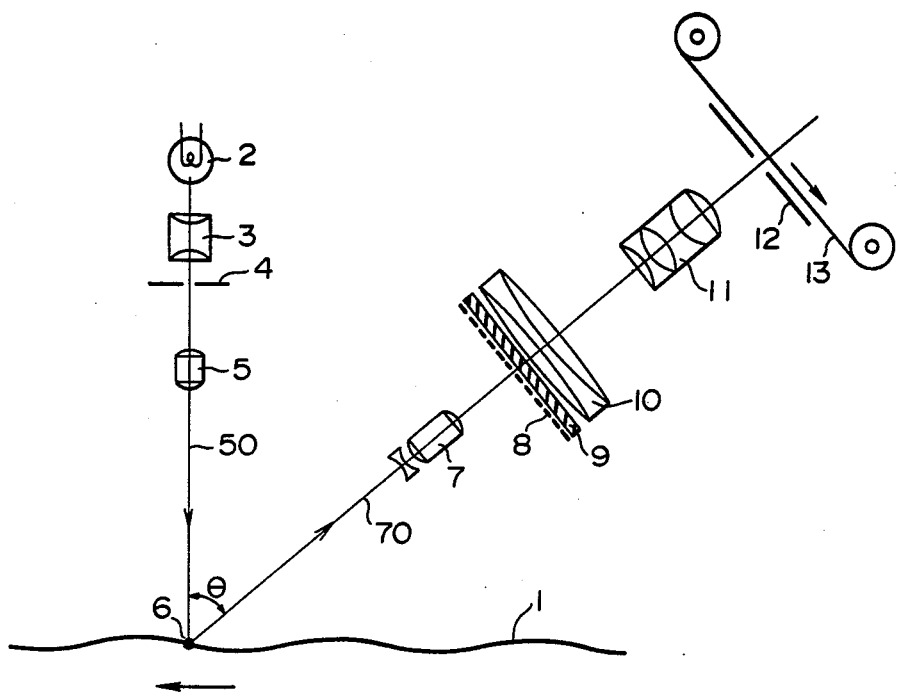
FIG. 1 is a side view showing an optical arrangement of the apparatus for carrying out the method in accordance with the present invention.

Referring to FIG. 1, a flexible web 1 such as a film base is continuously fed in the direction indicated by an arrow. Light from a light source 2 is projected onto the surface of the flexible web 1 in the form of a slit image 6 through a condenser lens 3, a slit 4 and a projection lens 5 arranged in a line in this order. The slit 4 extends in the lateral direction of the flexible web 1 so as to form a slit image 6 thereon extending in perpendicular to the feeding direction of the web 1. The slit image 6 formed on the web 1 is projected on a grid 8 by means of a focusing lens 7 the optical axis 70 of which is inclined at an angle $\theta$ with respect to the optical axis 50 of said projection lens 5. The angle $\theta$ is taken around the slit image 6 on the web 1 so that the slit image 6 may appear deformed to represent the surface irregularities of the web 1 when viewed along the optical axis 70 of the focusing lens 7. The grid 8 comprises a number of parallel slit elements forming a grating extending in parallel to the slit image 6 formed on the web 1. The grid 8 extends in perpendicular to the optical axis 70 so that a light section moire element is made through the grid 8 when the image of the slit image 6 on the web 1 is focused on the grid 8.

Figure 2:
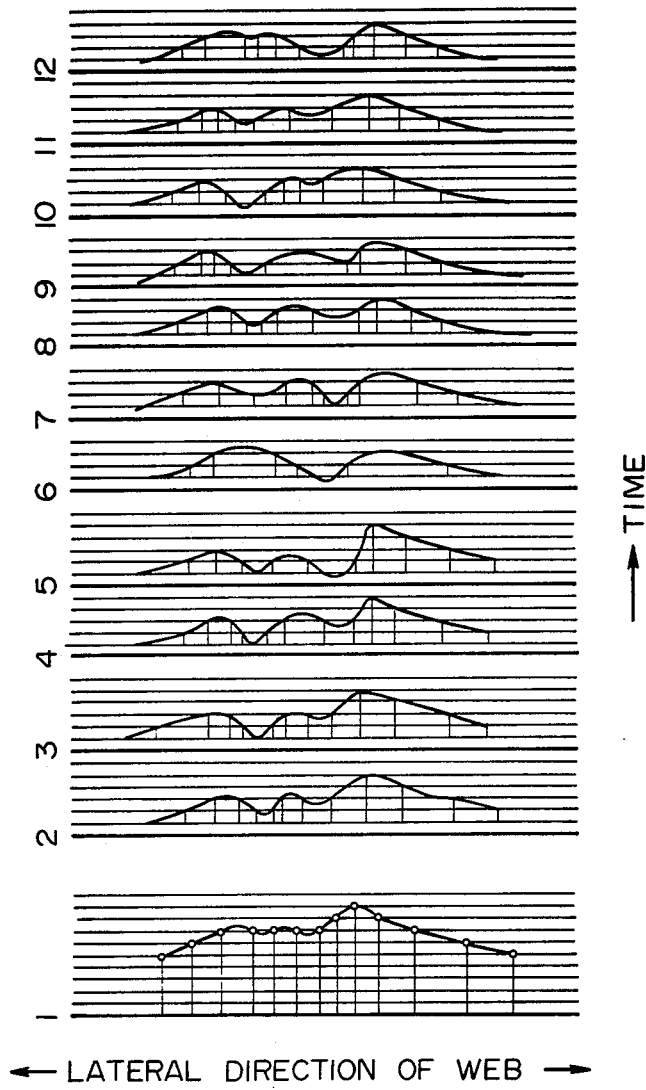
FIG. 2 is a diagram which shows various examples of the light section moire element obtained in accordance with the present invention.

Examples of the light section moire element are shown in FIG. 2. The light section moire element comprises a number of light spots arranged in a curved line which represents the surface irregularities of the web 1 formed by the interaction of the grid 8 and the image of the slit image 6 focused on the grid 8.

Immediately behind the grid 8 is located a light deflecting member 9 for correction of the parallax caused by the oblique viewing of the slit image 6 formed on the web 1. As the light deflecting member 9 is employed, for instance, a deflecting prism or a glass fiber plate. The function of the deflecting member 9 is to enlarge the curve of the light section moire element made through the grid 8 in the lateral direction of the slit image by the degree of $1/\sin\theta$ in order to make the parallax caused by the oblique viewing made at the angle of $\theta$ ($\theta < 90°$) equivalent to the parallax effecting in case that $\theta = 90°$. A glass fiber plate is more advantageous than the deflecting prism in that the chromatic aberration can be eliminated thereby.

Figure 3:
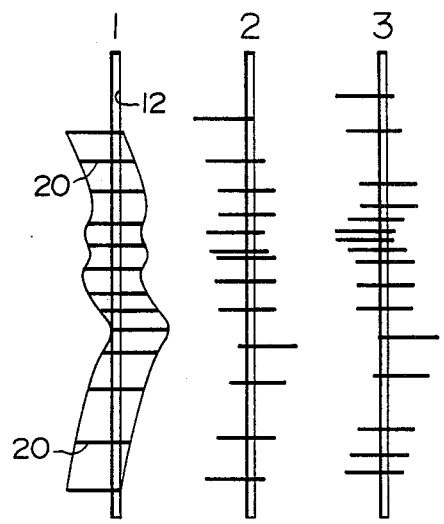
FIG. 3 is a diagram which shows various examples of the light section moire element expanded in the lateral direction of the slit employed in the present invention.
Figure 4:
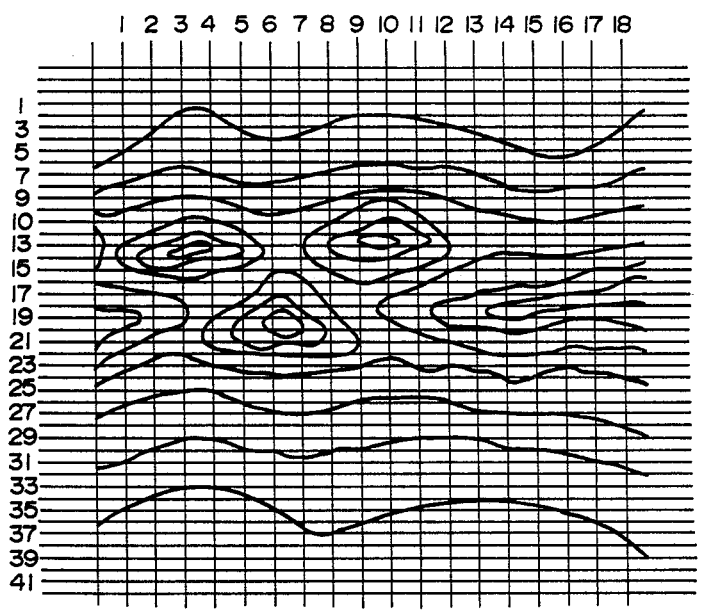
FIG. 4 is a diagram which shows an example of the finally obtained contour lines representing the surface irregularities of an object recorded in accordance with the present invention.

Behind the grid 8 and the deflecting member 9 is located a condenser lens 10, and behind it is located an anamorphic lens 11. The anamorphic lens 11 is a cylindrical lens which enlarges the light in one direction in a plane perpendicular to the optical axis 70. Behind the anamorphic lens 11 is provided a slit 12 extending in parallel to the slit image 6 formed on the web 1. Therefore, the anamorphic lens 11 and the condenser lens 10 form a number of parallel lines on the slit 12 as shown in FIG. 3 by enlarging respective light spots of the slit image in the lateral direction. As shown in FIG. 3, the parallel lines 20 are crossed by the slit 12 so that a line of spots may be recorded on a film 13 located behind the slit 12 as shown in FIG. 1. As apparently shown in FIGS. 2 and 3, the intervals of the line of spots recorded on the film 13 represent the surface irregularities of the web 1. The film 13 is continuously fed behind the slit 12 in synchronization with the travel of the web 1, whereby the surface irregularities of the web 1 are recorded on the film 13 in the form of contour lines as shown in FIG. 4 which represent the contour of the surface of the web 1.

For instance, as the web 1 advances in the lengthwise direction, the light section moire element changes from 1 to 12 in FIG. 2. The continuous change of the moire element makes a moire pattern on the film 13 as shown in FIG. 4 as the web 1 and the film 13 travel continuously in synchronization with each other.

It will be understood by those skilled in the art that the light deflecting member 9 is not absolutely necessary. Further, it will be noted that the angle of the optical axes 50 and 70 with respect to the surface of the web 1 may not always be as described above, but may be reversed or changed. For instance, both optical axes may be inclined at an angle with respect to the line normal to the surface of the web 1. Furthermore, it will also be understood that the object may not be a web but may be of any shape or material so long as it is a material travelling in one direction along a surface thereof.

We claim:

1. A method of recording surface irregularities of a moving object in the form of contour lines comprising the steps of:
    feeding an object in the direction in which the surface thereof extends,
    forming a slit image on the surface of the object by means of a first focusing optical system, said slit image extending in the direction perpendicular to the direction in which the object is fed,
    projecting an image of the slit image formed on the surface of the object onto a grid by means of a second focusing optical system having an optical axis inclined at an angle with respect to the optical axis of the first focusing optical system to form a light section moire element consisting of a number of light spots arranged at intervals representing the surface irregularities of the object, the grid being oriented in the position in which respective slits forming the grid are in parallel to the direction of said slit image,
    forming an image of the light section moire element on a slit located upon a photographic film through a condenser lens and an anamorphic lens which extends the respective light spots of the light section moire element in the lateral direction so that all the light spots extended are crossed by the slit, and
    feeding the photographic film in the lateral direction of the slit in synchronization with the movement of the object.

2. A method of recording surface irregularities of a moving object as defined in claim 1 wherein said slit image is formed on the surface of the object by the first focusing optical system having an optical axis perpendicular to the surface of the object.

3. A method as defined in claim 1 wherein said slit image is formed on the surface of the object by the first focusing optical system having an optical axis inclined at an angle with respect to the line perpendicular to the surface of the object.

4. An apparatus for recording surface irregularities of a moving object in the form of contour lines comprising
    a light source,
    a first slit provided in front of the light source,
    means for moving an object in the direction in which a surface thereof extends,
    a projection lens system provided in front of the first slit to project an image of the slit on the surface of the moving object, the image of the slit extending in the direction perpendicular to the direction of the movement of the object,
    a grid faced to said image of the slit projected onto the moving object, the direction of the grating thereof being in parallel to the image of the slit on the object,
    a focusing optical system having an optical axis inclined at an angle with respect to the optical axis of the projection lens system for focusing an image of said image of the slit projected onto the surface of the moving object on said grid to form a light section moire element by the interaction of the image of the slit and the grid,
    a second slit located behind said grid at a distance therefrom extending in parallel to the direction of the grating thereof,
    a lateral extending optical system provided between the grid and the second slit for forming a laterally extended image of said light section moire element made through the grid on said second slit, and
    means for feeding a photographic film behind said second slit in synchronization with the movement of the object in the lateral direction of the second slit.

5. An apparatus as defined in claim 4 wherein the optical axis of the projection lens system is perpendicular to the surface of the moving object.

6. An apparatus as defined in claim 4 wherein the optical axis of the projection lens system is inclined at an angle with respect to a line perpendicular to the surface of the moving object.

7. An apparatus as defined in claim 4 wherein said lateral extending optical system comprises a condenser lens and an anamorphic lens.

* * * * *